Jan. 17, 1956 A. D. BAKER ET AL 2,730,866
REFRIGERATING APPARATUS
Filed Dec. 26, 1952 3 Sheets-Sheet 1

INVENTOR.
Albert D. Baker
Kenneth L. Jones and
Ernest A. Leavengood
By Willits, Hardman & Behr
Attorneys INVENTOR.
Albert D. Baker
Kenneth L. Jones and
Ernest A. Leavengood By Willits, Hardman & Fehr.
Attorneys Jan. 17, 1956  A. D. BAKER ET AL  2,730,866
REFRIGERATING APPARATUS
Filed Dec. 26, 1952  3 Sheets-Sheet 3

INVENTOR.
Albert D. Baker
Kenneth L. Jones and
Ernest A. Leavengood

By *Willits, Hardman & Fehr.*
Attorneys

United States Patent Office

2,730,866
Patented Jan. 17, 1956

2,730,866
REFRIGERATING APPARATUS

Albert D. Baker, Kenneth L. Jones and Ernest A. Leavengood, Lansing, Mich., assignors to General Motors Corporation, Detroit, Mich., a corporation of Delaware Application December 26, 1952, Serial No. 328,118

10 Claims. (Cl. 62—4)

This invention relates to refrigerating apparatus and more particularly to air conditioning apparatus for use in a passenger automobile or the like.

It is an object of this invention to provide an air conditioning system and controls therefor capable of withstanding the jarring to which equipment on an automobile is subjected.

Another object of this invention is to provide an improved type of control which is trouble free and inexpensive and at the same time capable of providing proper comfort for each of the passengers.

Generally it has been considered necessary to depend entirely on automatic thermostatic controls for maintaining predetermined temperature conditions in the passenger compartment of an automobile and to rely on thermostatic adjustments for maintaining proper comfort under varying conditions. Controls of this type fail to take into consideration that different passengers have different ideas as to what constitutes comfort. It is an object of this invention to use the simplest type of main air temperature control but to make it possible for the passengers to individually control the effective air conditioning in the particular zone affecting them.

Still another object of this invention is to provide an improved air deflector means for use in distributing the conditioned air supplied to the passenger compartment of a car.

Further objects and advantages of the present invention will be apparent from the following description, reference being had to the accompanying drawings, wherein a preferred form of the present invention is clearly shown.

Figure 1:
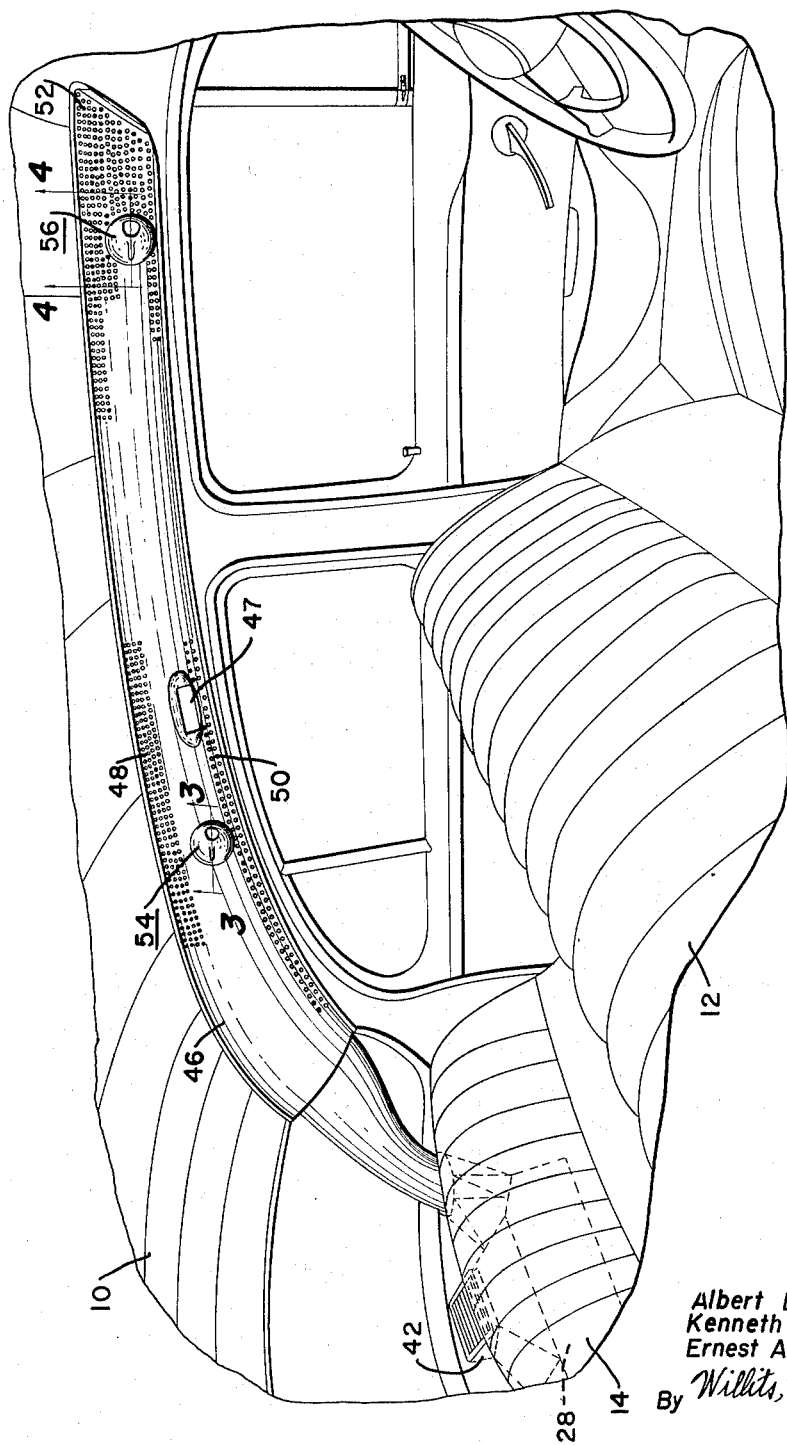
Figure 1 is a fragmentary pictorial view showing an automobile equipped with the improved air distributing means.

Referring now to the drawings wherein a preferred embodiment of the invention has been shown, reference numeral 10 generally designates a conventional passenger automobile having a front seat 12 and a back seat 14. The air conditioning equipment used for supplying conditioned air to the passenger compartment of the car includes a compressor 16 which is adapted to be directly belted to the main car engine 17 by means of the belt 19 so as to be driven thereby. The compressor 16 discharges the compressed refrigerant into a condenser 18 located in front of the engine radiator. The relative location and arrangement of the engine 17, the compressor 16 and the condenser 18 have been diagrammatically shown as these may be varied without departing from the spirit of the invention. For a more complete description and disclosure of the manner in which the various parts of the refrigerant circuit are installed in an automobile, reference is hereby made to copending applications Serial No. 266,718, filed January 16, 1952, and Serial No. 324,082, filed December 4, 1952.

The condensed refrigerant flows from the condenser to a receiver 20 through the refrigerant line 22 in which a check valve 24 is located. This check valve permits the free flow of refrigerant from the condenser into the receiver but prevents any reverse flow of refrigerant whereby all liquid refrigerant which once enters the receiver must flow through the evaporator 26 before returning to the compressor. The liquefied refrigerant is fed from the receiver 20 into an evaporator 26 which is mounted in an evaporator housing 28 located in the trunk compartment of the car. The flow of liquid refrigerant to the evaporator is controlled by means of a thermostatic expansion valve 30 which is located at the inlet to the evaporator and is provided with a conventional thermostatic bulb 32 adjacent the outlet of the evaporator so as to throttle the flow of refrigerant to the evaporator when the refrigerating effect reaches the outlet side of the evaporator in accordance with well known practice. The vaporized refrigerant leaving the evaporator returns to the inlet of the compressor through the suction line which has been designated by the reference numeral 34.

Figure 2:
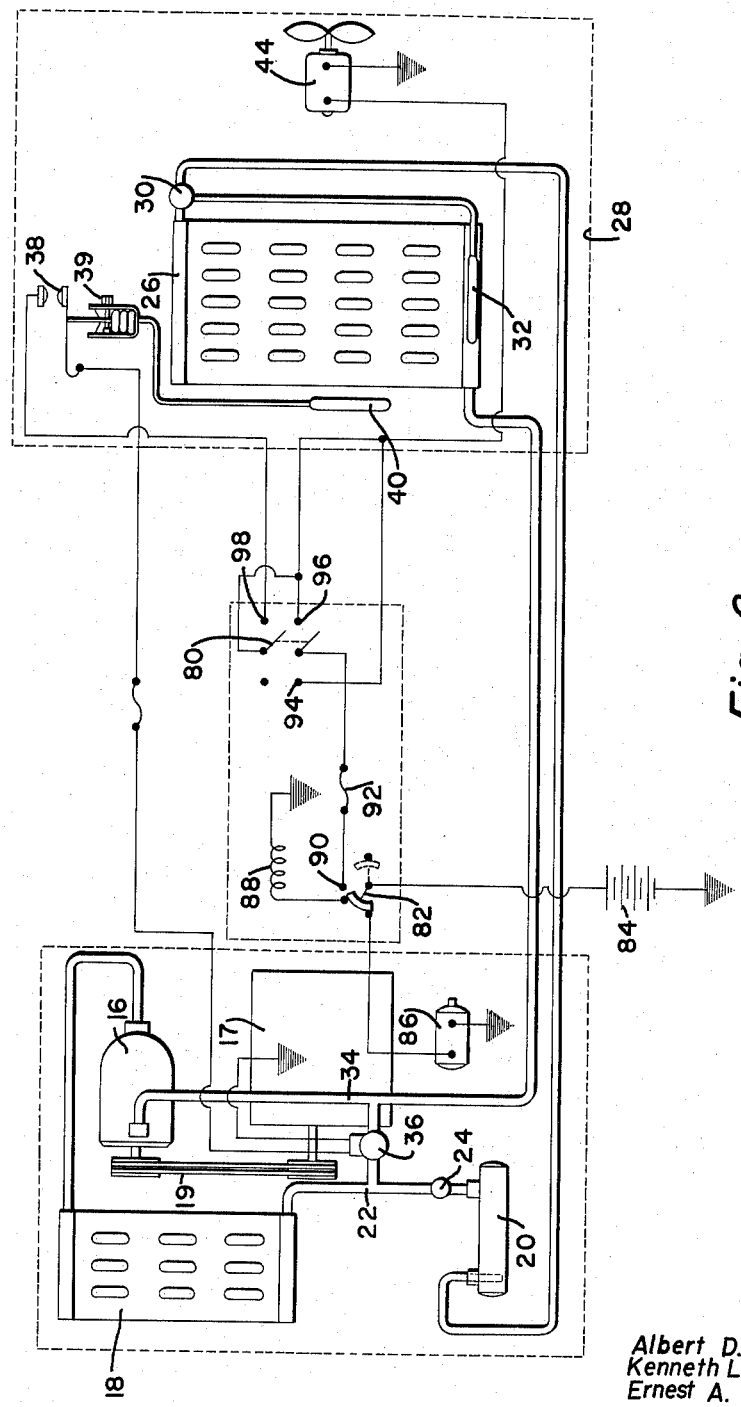
Figure 2 is a diagrammatic view showing the refrigerant and electric circuits.

In view of the fact that the compressor is directly connected to the engine which operates the car it is obvious that the normal output of the compressor will vary considerably with changes in the car speed and consequently it is necessary to provide some means for reducing the refrigerant effect at high speeds and at lower air temperatures such as encountered in cool weather. As shown in Figure 2 of the drawings, a by-pass line has been provided between the outlet of the condenser and the inlet of the compressor for this purpose. A normally open solenoid valve 36 is provided in this by-pass line and serves to by-pass refrigerant directly from the outlet of the condenser to the suction line or inlet of the compressor whenever the valve 36 is deenergized. When the valve 36 is energized it will be opened and the refrigerant pressure within the condenser will obviously be materially reduced with the result that any liquid refrigerant then in the condenser will immediately vaporize and return to the compressor and thereby help cool the compressor.

As shown in Figure 2 of the drawing, the solenoid valve 36 is arranged in circuit with a thermostatically operated switch 38 having a temperature responsive element 40 which is located in the return air duct 42 (see Figure 1) so as to respond to changes in temperature within the passenger compartment of the car. The setting of the thermostatically operated switch 38 is such that when the car temperature exceeds a predetermined value the switch 38 will be closed so as to energize the solenoid valve 36 and thereby close the by-pass. Any well known type of inexpensive thermostatic switch may be used for this purpose. For a more complete description of the form of switch illustrated in the drawing, reference is hereby made to Patent 2,351,038. The temperature at which the switch 38 closes may be adjusted by means of the screw 39. Upon closing of the by-pass by the valve 36 the refrigeration system will function as a conventional system to cool the air for the passenger compartment of the car. The blower means 44 serves to circulate the air to be conditioned in thermal exchange with the evaporator.

As best shown in Figure 1 of the drawings the air leaving the evaporator is distributed into the car through duct means 46 located adjacent the sides of the car directly above the side windows. While only one duct appears in Figure 1 of the drawings a similar duct is provided on each side of the passenger compartment. Each duct is provided with a plurality of sets of perforations 48, 50 and 52 small enough in relation to the duct wall thickness that the air discharges parallel to the hole centerline. The perforations 48 serve to direct a blast of conditioned air upwardly along the ceiling of the rear passenger compartment. The perforations 50 serve to direct a curtain of cool air downwardly along the side wall of the rear passenger compartment and the perforations 52 serve to similarly direct air into the front portion of the car. It will be noted that a large number of perforations are provided adjacent the front end of the duct so as to direct some of the conditioned air forwardly towards the windshield of the car. In addition to the above described perforations a pair of air directors generally designated by the reference numerals 54 and 56 are provided in each of the air distributing ducts 46. The air directors 54 are located adjacent the rear seat so as to make it possible for the occupants of the rear seat to control both the volume and direction of conditioned air directed towards them.

Figure 4:
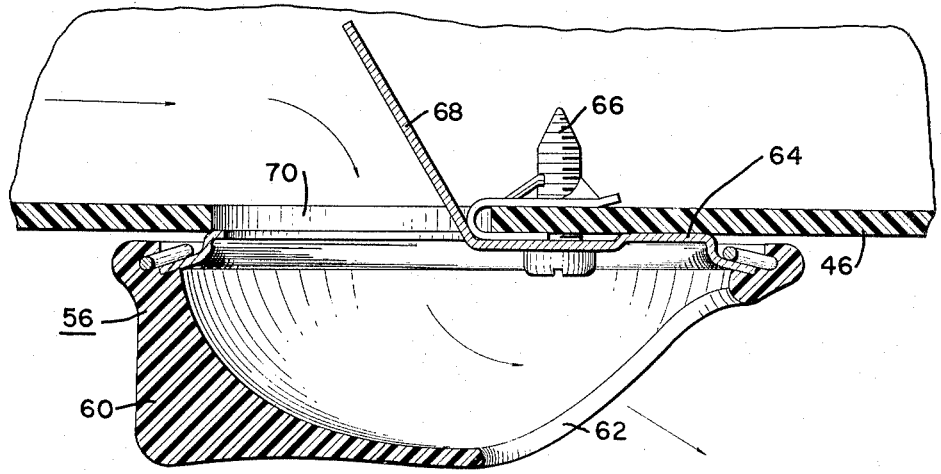
Figure 4 is a view similar to Figure 3 but showing the deflector mounted adjacent the front seat of the car.
Figure 5:
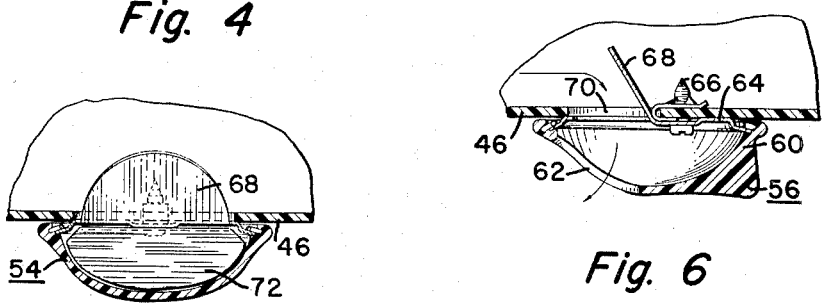
Figure 5 is a sectional view taken substantially on line 5—5 of Figure 3.
Figure 6:
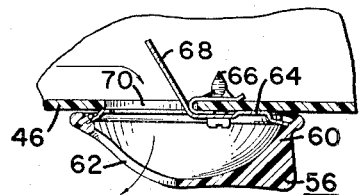
Figure 6 is a view similar to Figure 4 but showing the air deflector rotated through an angle of 180 degrees.

Somewhat similar air deflectors 56 are located adjacent the front seat so as to enable the occupants of the front seat to control the amount of cold air directed towards them. As best shown in Figures 4 and 6 of the drawings the air deflectors 56 comprise a rotatable molded plastic element 60 having an air outlet 62 on its one side. The element 60 is rotatably supported on a plate 64 secured to the side wall of the air duct 46 by means of one or more fastening means 66. A scoop or vane-like projection 68 is arranged to extend into the air duct to divert air from the air duct through an opening 70 in the side wall of the duct and into the interior of the rotatable element 60. By virtue of the above described arrangement it is obvious that the direction of air flow may be changed by rotating the element 60. Thus Figure 4 shows the air being deflected in a forwardly direction whereas Figure 6 shows the element 60 rotated to a position in which the air is directed more in a rearward direction.

Figure 3:
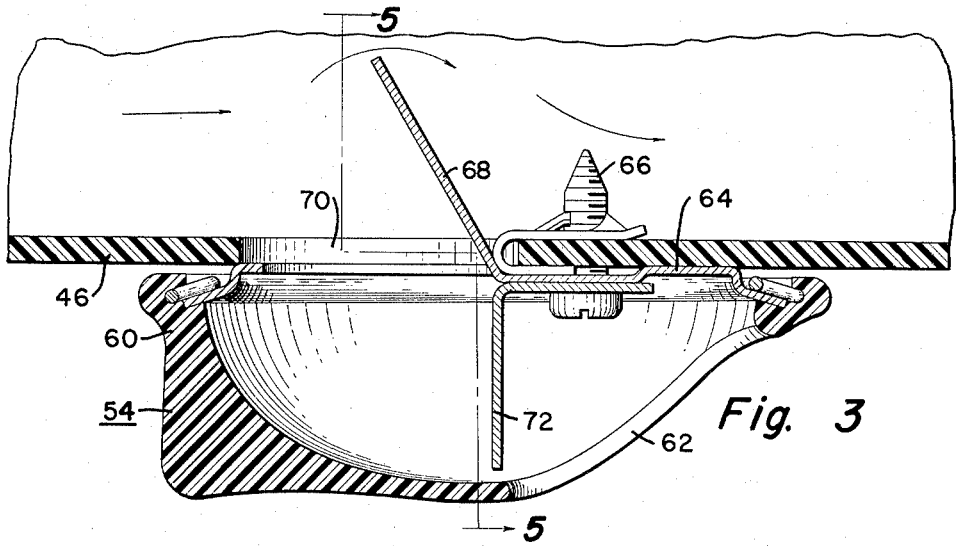
Figure 3 is a sectional view taken substantially on line 3—3 of Figure 1.

The air deflector 56 located opposite the front seat merely changes the direction of air flow whereas the air deflector 54 serves not only to change the direction of air flow but also includes means for shutting off the flow of air in the one position of the same. The means for shutting off the air flow consists of a baffle 72 which projects up into the rotatable element 60 so as to shut off completely the air flow when the air outlet opening 62 and the air outlet opening 70 are located on opposite sides of the baffle 72 such as shown in Figure 3. Rotation of the air deflector element 60 from the position shown in Figure 3 causes the air outlet 62 to move towards the other side of the baffle 72 so as to permit a variable amount of air to discharge through the outlet 62 into the rear passenger compartment. The reason for providing the baffle 72 only in the rear air deflectors is to enable the occupant or occupants of the front seat to completely close the air deflectors 54 when the back seat is unoccupied. Since the only difference between the deflectors 54 and 56 is in the use of the baffle 72 in the one, the same reference numerals have been used to designate like parts in the deflectors.

Generally it has been considered necessary to depend entirely on thermostatic controls for maintaining comfortable conditions in the passenger compartment of the car and to adjust the thermostat to compensate for varying conditions but satisfactory adjustable thermostats are expensive and a source of potential trouble and at the same time are incapable of compensating for different requirements of different individuals. By virtue of the above described air deflectors it is possible to regulate the amount and direction of air flow in each of the four corners of the passenger compartment. As explained hereinabove the thermostatically operated switch 38 opens and closes the by-pass valve 36. When the by-pass valve 36 is closed full refrigeration capacity is available for cooling the air. When the by-pass is opened, the pressure on the liquid refrigerant in the receiver and the evaporator is obviously reduced but the temperature of the refrigerant in the evaporator will be much lower than the temperature of the refrigerant in the condenser and consequently very little refrigeration is available in the evaporator. However, experience shows that a small amount of liquid refrigerant continues to evaporate in the evaporator even when the by-pass valve 36 is open. This is due partly to the fact that when the by-pass valve 36 first opens an appreciable amount of liquid refrigerant will normally be trapped in the receiver 20 and this will gradually feed into the evaporator 26 so as to provide a small amount of cooling. As a consequence of the above effect, opening of the by-pass valve 36 materially reduces the amount of cooling available but it does not completely stop all cooling. Thus, in order to stop all air conditioning it is not only necessary to open the by-pass valve 36 but also shut off the air circulating means.

The entire air conditioning system is under control of the ignition switch 82 which has been diagrammatically shown in Figure 2 of the drawing. The ignition switch 82 has been shown in the engine cranking position whereby current is supplied from the battery 84 to the starter motor 86 and the ignition coil 88 in accordance with standard practice. Upon the main car engine starting the ignition switch 82 will be rotated slightly in the clockwise direction so as to continue to close the circuit from the battery 84 to the ignition coil 88 and to also engage the contact 90 which connects the one portion of the master air conditioning control switch 80 to the battery through a fuse 92.

The switch 80 is a double pole, three position, manually operated switch for controlling not only the air circulating means but also the by-pass valve 36. In the central or "off" position in which the switch 80 is shown in Figure 2, all refrigeration and air circulation is shut off as no current can flow to the blower motor 44 or the by-pass valve 36.

When it is merely desired to operate the blower without closing the by-pass valve 36, the double throw switch 80 is moved to the left so as to close the circuit from the battery to the contact 94 which leads to the blower motor 44. This position of the switch 80 is termed the "cool" position as only a limited amount of cooling is then produced. (For purposes of simplifying the disclosure only the one blower unit 44 has been shown whereas in actual practice two separate blowers may be used and these blowers may be operated by a single motor or by two separate motors both controlled in a manner in which the motor 44 is controlled.) When it is desired to operate the air conditioning system so as to provide maximum cooling, the switch 80 is moved to the right or "cold" position so as to engage the contacts or poles 96 and 98. In this position of the switch 80 the blower means will operate continuously as long as the ignition switch is in the "on" position and the by-pass valve 36 will be placed under control of the thermostatically operated switch 38 with the result that full refrigerating effect will be provided whenever the thermostatic element 40 indicates that the car temperature exceeds a predetermined value. The thermostat 38 is preferably of the type which is set at the factory to open and close at a predetermined temperature setting. However, thermostats of this type usually include an adjustment 39 which may be made by a serviceman out in the field. This adjustment however is not accessible for the occupants of the car to change at will. The occupants simply change the air deflectors next to them for changing the amount of cooling affecting them.

While the form of embodiment of the invention as herein disclosed constitutes a preferred form, it is to be understood that other forms might be adopted, as may come within the scope of the claims which follow.

What is claimed is as follows:

1. In an air conditioning system for cooling and ventilating the passenger compartment of an automobile, a refrigerating system including a compressor, a condenser, a receiver, and an evaporator connected in series refrigerant flow relationship, first refrigerant flow control means comprising a pressure reducing means between said receiver and said evaporator, second refrigerant flow control means responsive to refrigeration requirements in said passenger compartment for effecting a materially reduced flow of refrigerant to said evaporator in response to a decrease in refrigeration requirements, blower means for circulating air to be conditioned in thermal exchange relationship with said evaporator and thereafter into said passenger compartment, manually controlled air outlet grill means for varying the amount of air distributed to various parts of said compartment, a power source, circuit means for connecting said power source to said blower means and said second control means, said circuit means including a multiple position switch so constructed and arranged whereby in one position of said switch said blower means and said control means are both deenergized whereas in a second position of said switch the blower means only is energized and in a third position of said switch the blower means and said second control means are both energized.

2. In an air conditioning system for cooling and ventilating the passenger compartment of an automobile, a refrigeration system including a compressor, a condenser, a receiver and an evaporator connected in series refrigerant flow relationship, pressure reducing means between said receiver and said evaporator for controlling the flow of refrigerant to said evaporator, a check valve between said condenser and said receiver, refrigerant by-pass means between the inlet of said compressor and the outlet of said condenser, a normally open solenoid valve in said by-pass, blower means for circulating air to be conditioned in thermal exchange relationship with said evaporator, a source of electrical power, circuit means for connecting said source of power to said solenoid valve and said blower means, said circuit means including first switch means for controlling the energization of said solenoid valve in response to changes in refrigeration requirements and second switch means including a multiple position, manually operable switch in said circuit means for controlling the supply of power to said blower means and said first switch means and said solenoid valve, said manually operable switch having one position in which only said blower means is energized, a second position in which said blower and the circuit to said first switch means are both energized and a third position in which neither said blower means nor said first switch means are connected to said source of power.

3. In an air conditioning system for cooling and ventilating the passenger compartment of an automobile, a refrigeration system including a compressor, a condenser, a receiver and an evaporator connected in series refrigerant flow relationship, pressure reducing means between said receiver and said evaporator for controlling the flow of refrigerant to said evaporator, a check valve between said condenser and said receiver, refrigerant by-pass means between the inlet of said compressor and the outlet of said condenser, a normally open solenoid valve in said by-pass, blower means for circulating air to be conditioned in thermal exchange relationship with said evaporator, a source of electrical power, circuit means for connecting said source of power to said solenoid valve and said blower means, said circuit means including first switch means for controlling the energization of said solenoid valve in response to changes in refrigeration requirements and second switch means including a multiple position manually operable switch in said circuit means for controlling the supply of power to said blower means and said first switch means and said solenoid valve, said manually operable switch having one position in which only said blower means is energized, a second position in which said blower means and the circuit to said first switch means are both energized and a third position in which neither said blower means nor said first switch means are connected to said source of power, an engine for operating said automobile, torque transmitting means between said engine and said compressor, a starter motor, means for cranking said engine by said starter motor, means for controlling the operation of said engine and said starter motor comprising a combination starter and ignition switch including means for disconnecting said manually operable switch means from the power source during the cranking operation.

4. In an air conditioning system for cooling and ventilating the passenger compartment of an automobile, a refrigeration system including a compressor, condenser, receiver and evaporator connected in series refrigerant flow relationship, pressure reducing means between said receiver and said evaporator for controlling the flow of refrigerant to said evaporator, refrigerant by-pass means between the inlet of said compressor and the outlet of said condenser, a solenoid valve in said by-pass, blower means for circulating air to be conditioned in thermal exchange relationship with said evaporator, a source of electrical power, circuit means for connecting said source of power to said solenoid valve and said blower means, said circuit means including first switch means for controlling the energization of said solenoid valve in response to changes in refrigeration requirements and second switch means including a multiple position, manually operable switch in said circuit means for controlling the supply of power to said blower means and said first switch means and said solenoid valve, said manually operable switch having one position in which only said blower means is energized, a second position in which said blower means and the circuit to said first switch means are both energized and a third position in which neither said blower means nor said first switch means are connected to said source of power, an engine for operating said automobile, torque transmitting means between said engine and said compressor, a starter motor, means for cranking said engine by said starter motor, means for controlling the operation of said engine and said starter motor comprising, a combination starter and ignition switch including means for disconnecting said manually operable switch means from the circuit during the cranking operation, and manually operable means for controlling the distribution of the conditioned air within said passenger compartment.

5. In a cooling unit for use on an automobile having a passenger compartment, the combination comprising a housing, an evaporator within said housing, said housing including air outlet means for discharging conditioned air, duct means communicating with said air outlet means and extending longitudinally along one side of the passenger compartment, said housing having a return air inlet through which air from the passenger compartment is returned to said housing, blower means for withdrawing air from said passenger compartment and for directing the air thus withdrawn in thermal exchange with said evaporator for discharging the air into said duct means, said duct means having a plurality of relatively small air outlets for directing air along the walls of the passenger compartment and a pair of relatively large air outlets for directing air onto the passengers and adjustable air deflectors in said larger outlets.

6. In a cooling unit for use in an automobile having a passenger compartment, the combination comprising a housing, an evaporator within said housing, said housing including air outlet means for discharging conditioned air, duct means communicating with said air outlet means and extending longitudinally along one side of the passenger compartment, said housing having a return air inlet through which air from the passenger compartment is returned to said housing, blower means for withdrawing air from said passenger compartment and for directing the air thus withdrawn in thermal exchange with said evaporator and thereafter discharging the air into said duct means, said duct means having a plurality of relatively small air outlets and a pair of relatively large air outlets, and air deflector means arranged adjacent said relatively large air outlet for controlling the direction of air flow therethrough, at least one of said air deflector means including means for controlling the volume of air leaving said deflector means.

7. An air conditioning apparatus for an automobile having a passenger compartment comprising, refrigerating apparatus including a cooling coil, means for circulating air to be conditioned in thermal exchange with said cooling coil, means responsive to the temperature of the air in said compartment for controlling said refrigerating apparatus, duct means for directing the air thus cooled into said passenger compartment, said duct means including a wall having spaced air outlets, adjustable air deflector means adjacent said outlets having scoop means projecting into said duct means and having means for varying the direction of the air leaving said outlets.

8. An air conditioning apparatus for an automobile having a passenger compartment comprising, refrigerating apparatus including a cooling coil, means for circulating air to be conditioned in thermal exchange with said cooling coil, duct means for directing the air thus cooled into said passenger compartment, said duct means including a wall having large and small perforations, adjustable air deflector means adjacent said large perforations for varying the direction of the air flowing through said large perforations, said air deflector means comprising semi-spherical elements each having an air outlet on one side of its axis, and means for rotatably supporting each of said last named elements on the wall of said air distributing duct.

9. An air conditioning apparatus for an automobile having a passenger compartment comprising in combination, refrigerating apparatus including a cooling coil, means for circulating air to be conditioned in thermal exchange with said cooling coil, duct means for directing the air thus cooled into said passenger compartment, air temperature responsive means for controlling said refrigerating apparatus, said duct means including a wall having air outlet openings, adjustable air deflector means adjacent each of said openings for varying the direction of the air flowing through said openings, each of said air deflector means comprising a rotatable semi-spherical element having an air outlet on one side of its axis of rotation, means for rotatably supporting said last named element on one wall of said air distributing duct, and means projecting into one of said semi-spherical elements for preventing the air flow therethrough in one position of said element relative to its associated air outlet opening.

10. Air conditioning means for use in a private passenger type automobile having a passenger compartment having front and rear seats only therein comprising a refrigerating system including a cooling coil, means for flowing air to be conditioned in thermal exchange with said cooling coil, and means for directing the air thus cooled into said passenger compartment adjacent opposite side walls thereof, said last named means including individually controllable rotatable air deflector means adjacent said front and rear seats arranged to selectively discharge the air either upwardly along the ceiling of the car, downwardly towards the laps of the passengers or at some intermediate angle, the said air deflector means adjacent said rear seat including means for shutting off the air flow therethrough.

References Cited in the file of this patent

UNITED STATES PATENTS

| | | |
|---|---|---|
| 2,032,572 | Hammers et al. | Mar. 3, 1936 |
| 2,145,222 | Gunter | Jan. 24, 1939 |
| 2,155,632 | Anderson | Apr. 25, 1939 |
| 2,169,664 | Shifflett | Aug. 15, 1939 |
| 2,172,944 | Norris | Sept. 12, 1939 |
| 2,185,033 | Melcher | Dec. 26, 1939 |
| 2,286,961 | Hanson | June 16, 1942 |
| 2,311,622 | Alexander et al. | Feb. 23, 1943 |
| 2,344,864 | Griswold | Mar. 21, 1944 |
| 2,351,038 | Grooms | June 13, 1944 |